United States Patent [19]

Whitley

[11] Patent Number: 4,900,044
[45] Date of Patent: Feb. 13, 1990

[54] SIDE LOADING HAND TRUCK AND METHOD

[76] Inventor: Phillip D. Whitley, Rte. 5, P.O. Box 948, Charlotte, N.C. 28208

[21] Appl. No.: 40,277

[22] Filed: Apr. 20, 1987

[51] Int. Cl.⁴ .............................. B62B 1/14
[52] U.S. Cl. ................... 280/47.21; 414/476
[58] Field of Search ............ 280/47.12, 47.13 R, 280/47.17, 47.18, 47.21, 47.27, 47.28, 43.13, 43.12, 47.131; 414/470, 490, 474, 476

[56] References Cited

U.S. PATENT DOCUMENTS

| 1,800,679 | 4/1931 | Day | 280/47.27 |
| 2,700,573 | 1/1955 | Nordgard | 280/47.27 |
| 2,816,771 | 12/1957 | Hunt | 280/47.13 R |
| 4,284,287 | 8/1981 | Esposito | 280/47.37 R |
| 4,286,796 | 9/1981 | Esposito | 280/47.27 |
| 4,630,838 | 12/1986 | Stockton | 280/47.17 |

*Primary Examiner*—Charles A. Marmor
*Assistant Examiner*—Richard Camby
*Attorney, Agent, or Firm*—Clifton Ted Hunt

[57] ABSTRACT

A hand truck for the loading and moving of an elongated article through openings of less width than the length of the loaded article includes a loading fork on one side of the truck transverse to the axle of the truck and a handle on the opposite side of the truck. The truck is turned on its one side for loading and the fork is shaped to fit beneath an article to be loaded. The handle is extensible for mechanical advantage in loading the article while returning the truck to its wheels.

14 Claims, 6 Drawing Sheets

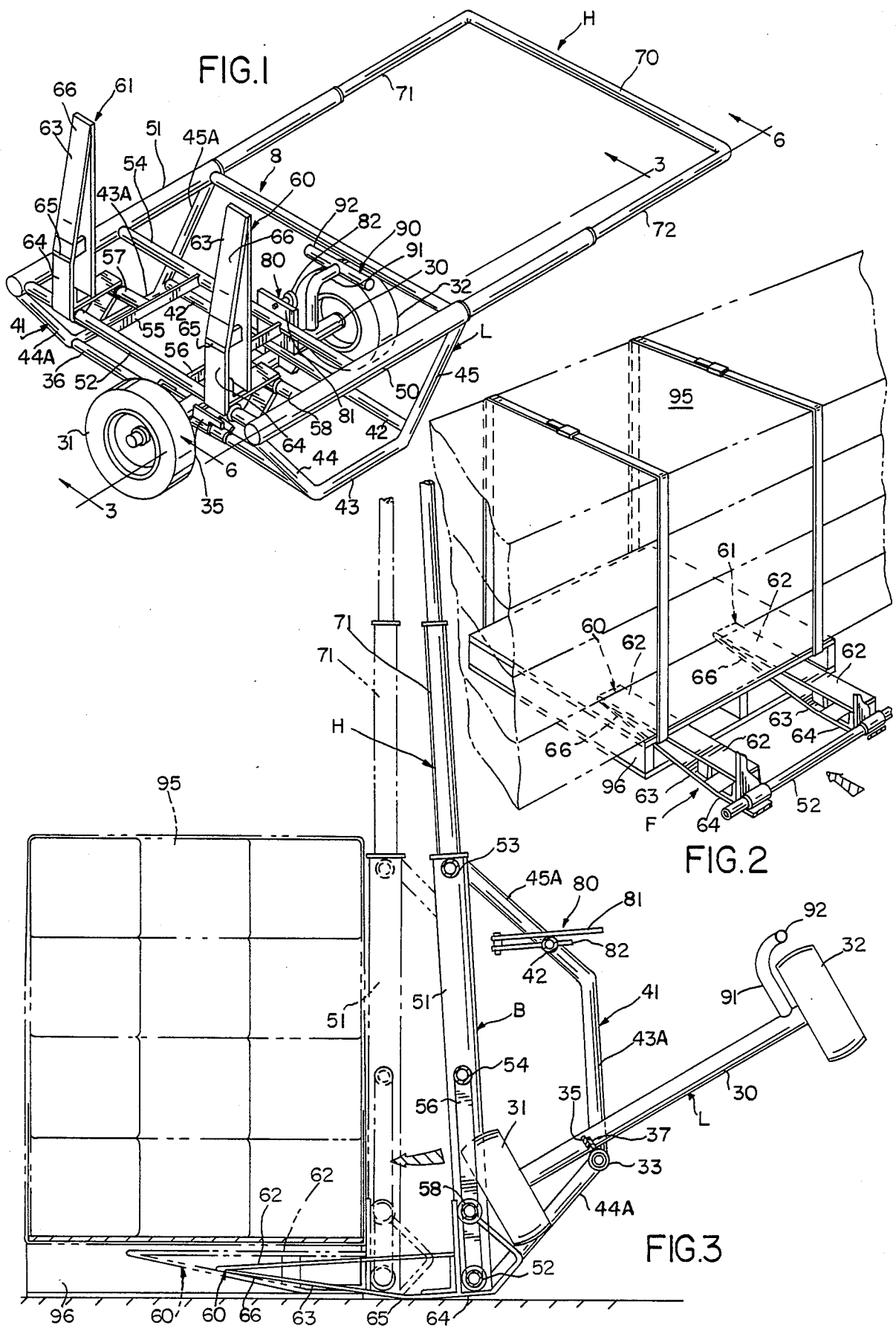

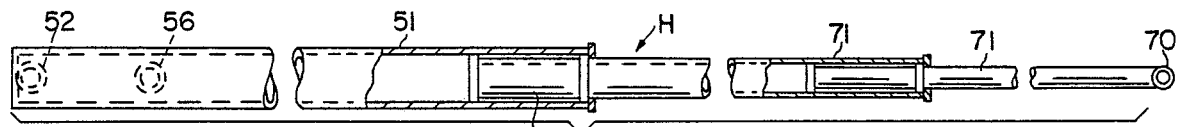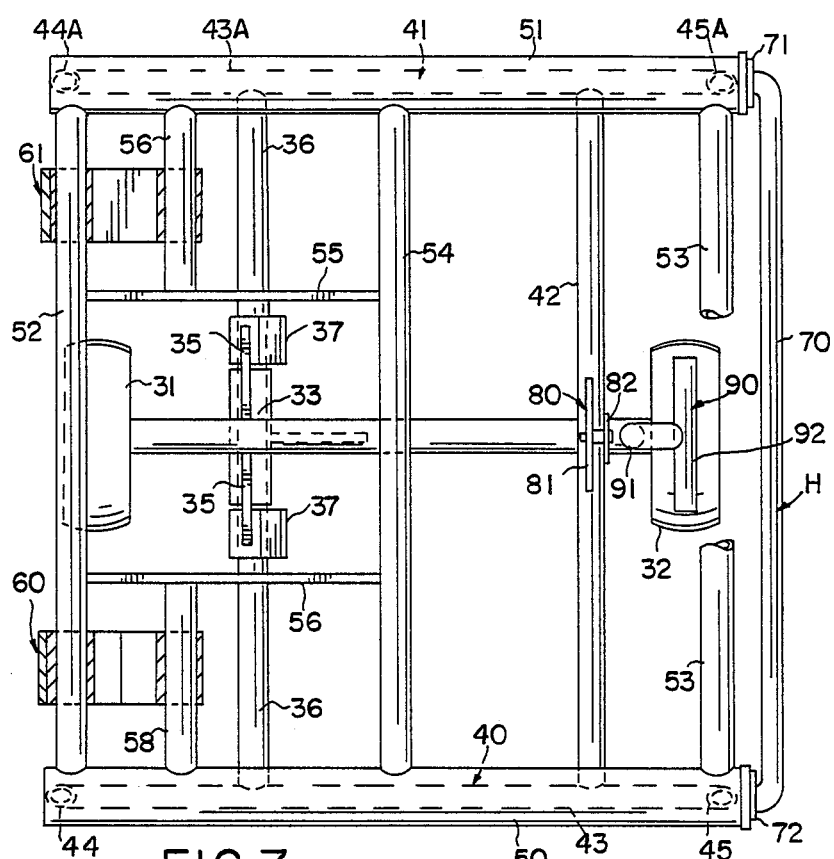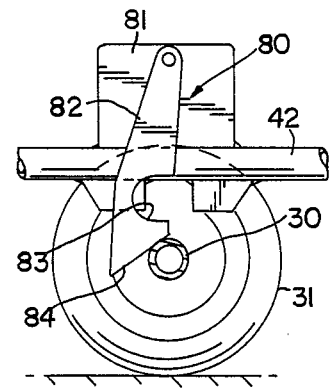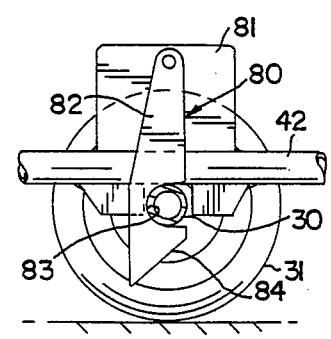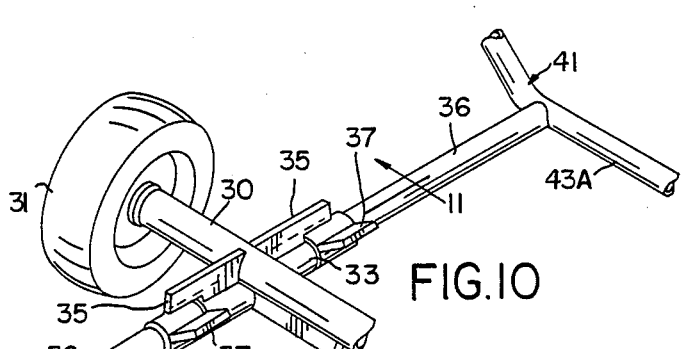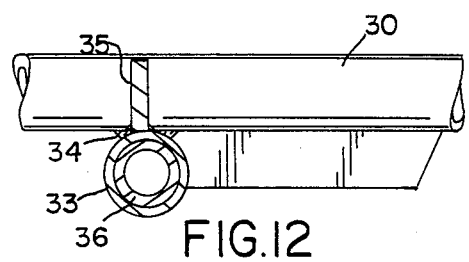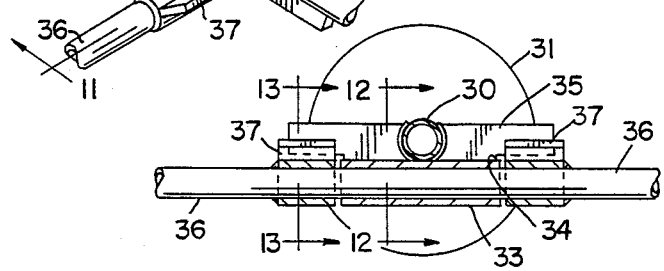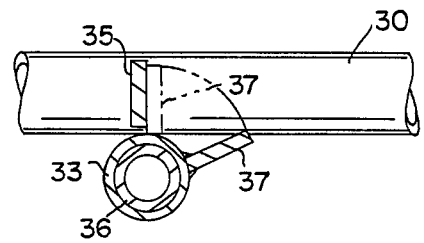

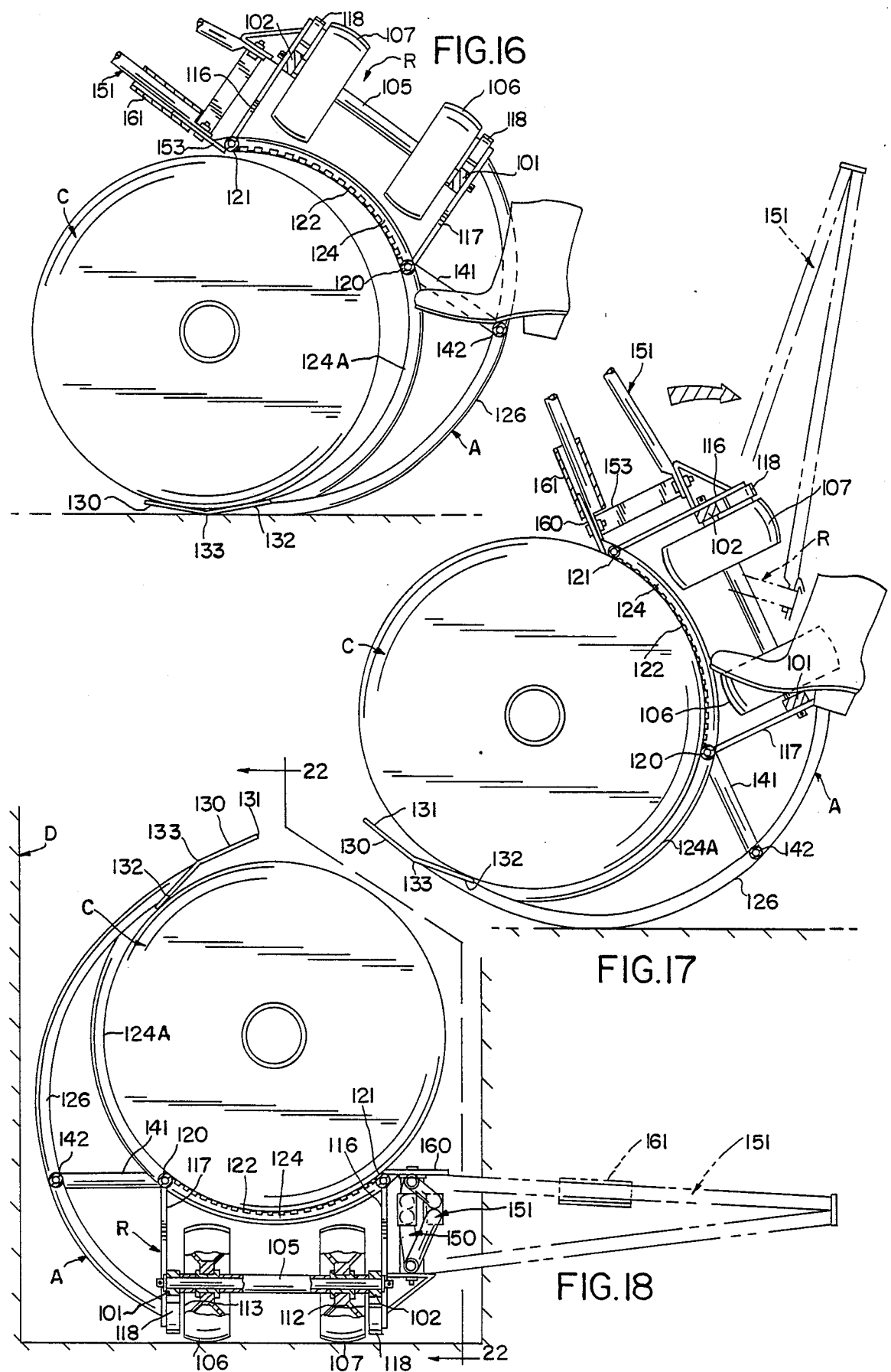

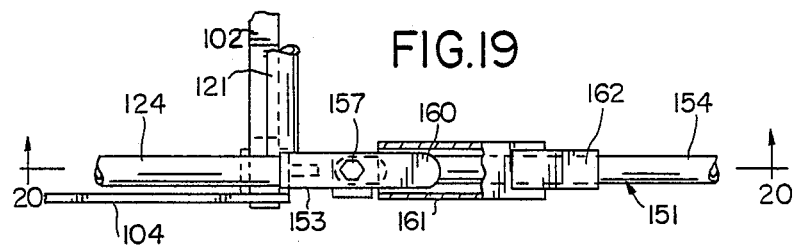
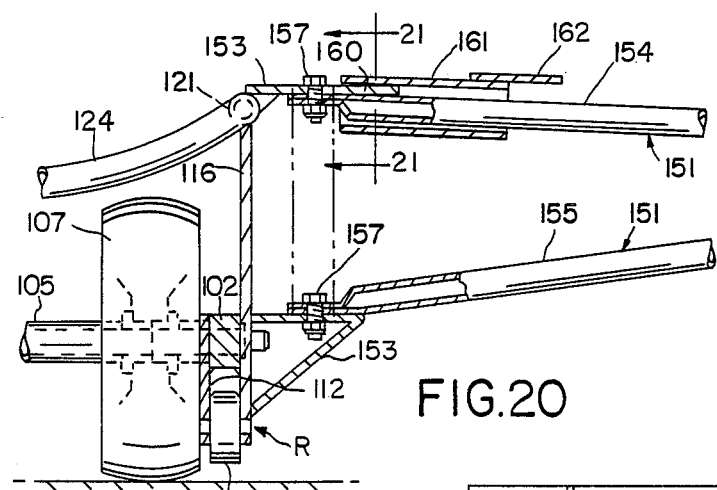
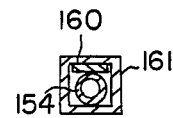
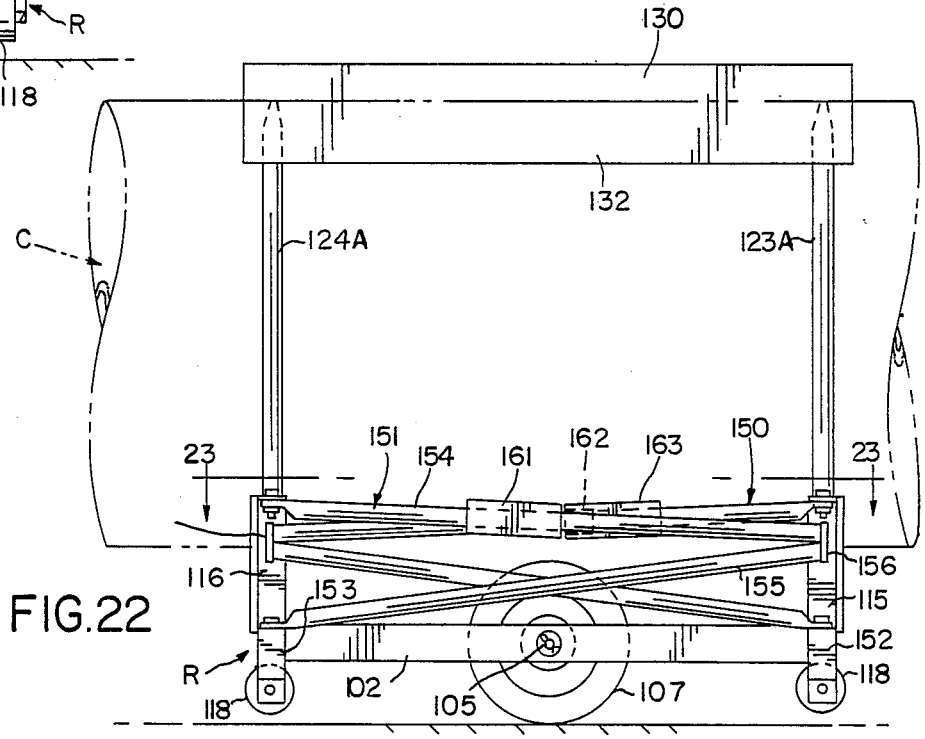
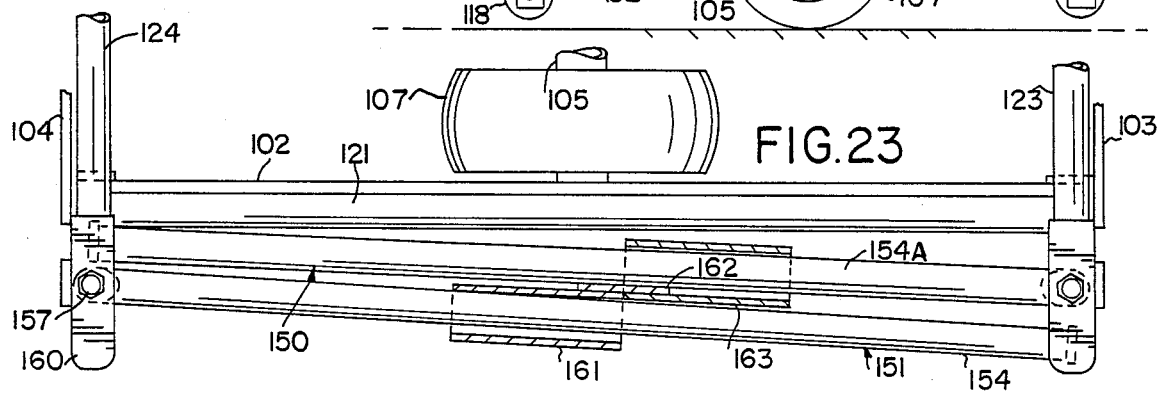

SIDE LOADING HAND TRUCK AND METHOD

FIELD OF THE INVENTION

This invention relates to two-wheeled hand trucks and to the method of loading and transporting heavy and elongated articles such as rolls of carpet, pipe, lumber, etc. through an opening, such as an ordinary doorway, of less width than the length of some of such articles (hereinafter sometimes referred to as cargo).

BACKGROUND OF THE INVENTION

Hand trucks having two wheels operatively placed between a toe plate and an elongated handle extending generally perpendicularly from each other are commonly used in warehouses and construction sites for conveying material from one location to another.

Elongated articles are conventionally loaded on such hand trucks with their longitudinal axes extending perpendicularly to the direction of travel of the hand truck, and it is sometimes necessary to convey the long articles through a restricted opening such as an ordinary 3 foot wide doorway which will accomodate the hand truck but will not accomodate the length of its transversely extending cargo.

In such instances, it is accepted practice to remove the articles from the hand truck, orient them so they extend parallel to the direction of travel through the doorway, and carry them through the doorway independently of the hand truck. After the unloaded hand truck is pushed through the doorway, it is reloaded with the elongated articles again extending perpendicularly to the path of travel and moved to its destination, or to the next doorway where the unloading and reloading is repeated.

U.S. Pat. No. 3,666,285 issued May 30, 1972 to William J. Fertig for AUXILIARY MOVEMENT MEANS FOR HAND TRUCKS represents an attempt to solve the problem of having to unload and reload a hand truck to get its elongated cargo through a doorway too narrow to accomodate the length of its transversely extending cargo. Fertig provides the usual two wheels for the hand truck and auxiliary wheels normally supported above the floor but selectively movable into operative position engaging the floor in position to move the hand truck in a direction parallel with the longitudinal axis of its cargo.

Fertig accomplishes the transition from the primary wheels to the auxiliary wheels by first positioning the auxiliary wheels in operative position and then tilting the truck rearwardly to transfer the weight of the truck and its contents from the primary wheels to the auxiliary wheels. Only two auxiliary wheels are provided by Fertig and they are located directly behind the primary wheels in use so that one of the auxiliary wheels follows the other when they are conveying the load, and this necessitates a careful balancing of the truck and its load while traveling on the pair of auxiliary wheels. The need to position the auxiliary wheels for use is time consuming and the need to balance the long and sometimes heavy load on the auxiliary wheels makes it difficult, especially for one person, to move the loaded hand truck through a doorway.

U.S. Pat. No. 4,460,189 issued July 17, 1984 to Frederick Goff for MULTI-DIRECTIONAL PORTABLE HAND TRUCK represents a more recent effort to solve the problem of getting a hand truck through a doorway too narrow to accomodate the length of transversely loaded articles. Goff provides dome-shaped wheels and an indexing mechanism for orienting the wheels to move the truck in a desired direction. It is necessary to stop the truck and individually orient each of the wheels from its position for normal travel in a direction perpendicular to the longitudinal axis of its cargo into a selected position for moving the truck and its cargo in a direction parallel with the longitudinal axis of the cargo. This is a time consuming and expensive procedure which is overcome by the present invention.

SUMMARY OF THE INVENTION

Applicant's hand trucks include the usual wheels, but differ from all known prior art hand trucks by providing for side loading of the hand truck so that heavy and elongated articles are loaded on the hand truck with their longitudinal axes parallel to the path of travel, instead of transverse to the path of travel, as in the prior art.

After the side loading hand truck of this invention is loaded with the longitudinal axis of the cargo parallel to the direction of travel there is no need to make any adjustment or reorientation before taking the loaded hand truck through any opening of less width than the length of the articles on the truck.

The placement of a loading fork on one side and a handle on the other side of the truck facilitates loading of the truck and may enable one person to load heavy cargo in a single operation.

BRIEF DESCRIPTION OF THE DRAWINGS

FIG. 1 is a perspective view showing one embodiment of the side loading hand truck with the wheels on the floor in traveling position and the handle extended preparatory to turning the truck on its fork side to the loading position of FIG. 3;

FIG. 2 is a perspective view, with parts broken away, of the hand truck shown in FIG. 1, illustrating the positioning of the loading fork beneath cargo to be loaded;

FIGS. 3, 4, and 5 are end views of the hand truck shown in FIG. 1 and sequentially illustrating the loading of elongated articles with their axes parallel with the direction of travel of the hand truck, and FIG. 5 shows the loaded truck capable of passing through a doorway of less width than the length of the loaded cargo;

FIG. 6 is an enlarged side view, partially in section, taken substantially along the line 6—6 in FIG. 1;

FIG. 7 is an enlarged plan view, partially in section, of the hand truck taken substantially along the line 7—7 in FIG. 5;

FIG. 8 is a side view, partially in section, taken substantially along the line 8—8 in FIG. 5 and illustrating the camming action of the axle latch;

FIG. 9 is a view similar to FIG. 8 but showing the axle latch in latched position for travel;

FIG. 10 is a perspective view, with parts broken away, illustrating the relative positions of the primary and auxiliary axles when the wheels are in the operative traveling position of FIG. 5;

FIG. 11 is a sectional view, partially in elevation, taken substantially along the line 11—11 in FIG. 10;

FIG. 12 is a sectional view, partially in elevation, taken substantially along the line 12—12 in FIG. 11;

FIG. 13 is a sectional view, partially in elevation, taken substantially along the line 13—13 in FIG. 11;

FIGS. 16, 17, and 18 are end views sequentially illustrating the loading of a heavy roll of carpet on the hand truck, and FIG. 18 shows the truck in a doorway of less width than the length of the cargo;

FIG. 19 is a plan view, with parts broken away for the purpose of illustration, taken substantially along the line 19—19 in FIG. 14 and showing the handle latch in latched position;

FIG. 20 is a sectional view, with parts in elevation, taken substantially along the line 20—20 in FIG. 19;

FIG. 21 is a sectional view taken substantially along the line 21—21 in FIG. 20;

FIG. 22 is a side elevation of the hand truck loaded with cylindrical cargo, shown in phantom lines, and showing the handles folded and latched for travel in a direction parallel to the longitudinal axis of the cargo; and FIG. 23 is a fragmentary plan view, with parts broken away and partially in section, taken substantially along the line 23—23 in FIG. 22 and illustrating the latching of the handles in closed traveling position.

DETAILED DESCRIPTION OF THE INVENTION

Figure 4:
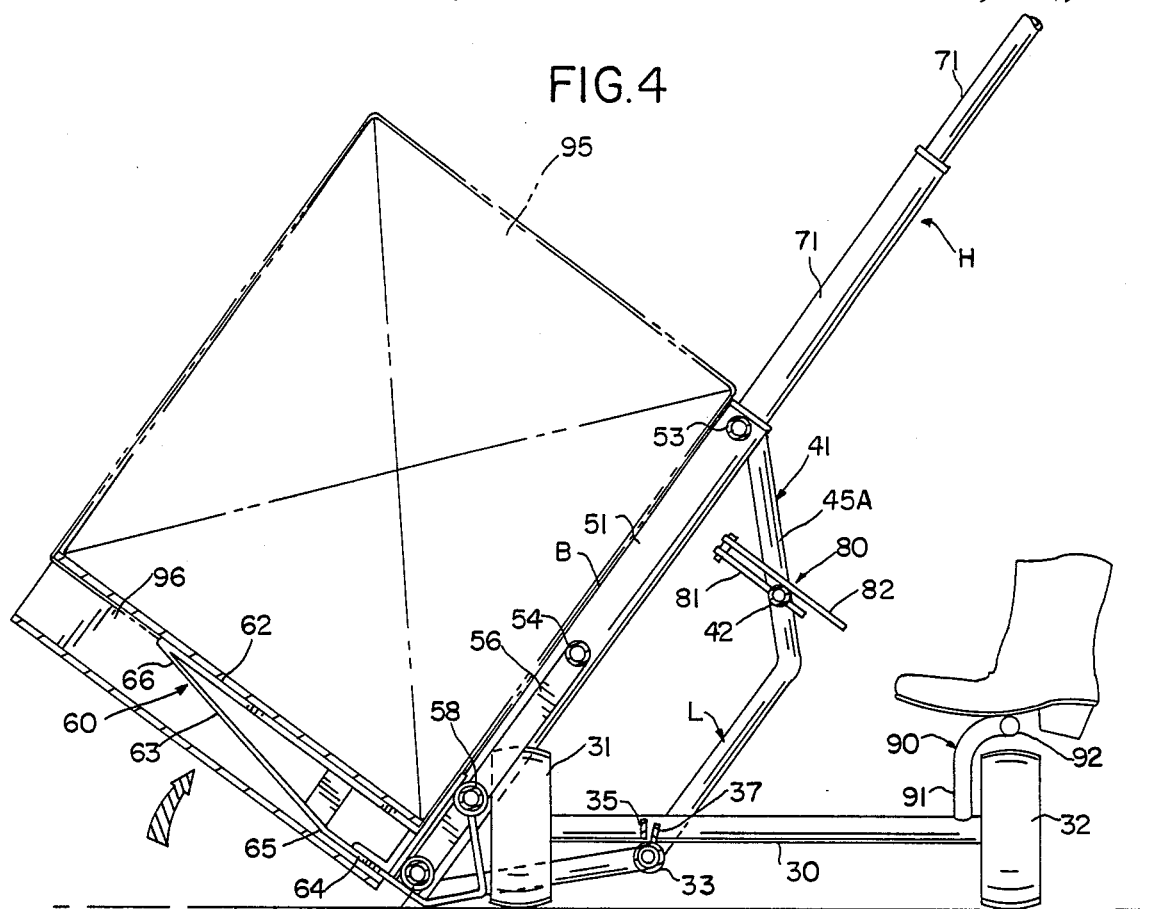

Referring more specifically to the drawings, one embodiment of the side loading hand truck is shown in FIGS. 1-13 and another embodiment is shown in FIGS. 14-23. The illustrated embodiments are representative of the concept of side loading a hand truck with several hundred pounds of elongated articles in a single operation with the longitudinal axis of the load always parallel to the direction of travel.

Referring to the embodiment of FIGS. 1-13, a primary axle 30 extends between wheels 31 and 32 journaled for rotation at opposite ends of the axle 30.

A short length of pipe 33 is welded as at 34 to the bottom of the axle 30 at a point spaced inwardly from the wheel 31 (FIGS. 10-12), and the pipe 33 extends transversely of the axle 30 to define a journal for an auxiliary axle 36 extending through the pipe 33 and between front and rear end pieces 40 and 41. The front and rear end pieces 40, 41 are also connected by a lower side frame member 42 extending in parallel relation to the auxiliary axle 36 and spaced inwardly from the wheel 32.

An abutment 35 is welded to the pipe 33 and extends upwardly from pipe 33 about the axle 30. A pair of flanges 37 are fixed to the auxiliary axle 36 on opposite sides of the primary axle 30 for engagement with the abutment 35 to limit relative movement between the auxiliary axle 36 and the primary axle 30.

The primary axle 30, auxiliary axle 36, lower side frame member 42, and end pieces 40, 41 define a lower support frame generally indicated at L. The end pieces 40, 41 include lower portions 43 and 43A, respectively, which are parallel with the axle 30 in the traveling position of FIGS. 1 and 5.

Upwardly diverging arms 44, 45, and 44A, 45A extend from their respective lower portions 43 and 43A and support an upper frame broadly indicated at B and comprising parallel tubular ends 50 and 51 extending parallel to the primary axle 30 above the lower frame portions 43 and 43A.

Upper side frame members 52 and 53 extend transversely to the primary axle 30 in overlying relation to wheels 31 and 32 and are secured to the tubular end pieces 50, 51. A medial upper frame member 54 extends in parallel relation to the upper side frame members 52 and 53 and is fixed at its ends to the tubular end pieces 50 and 51.

Reinforcing plates 55 and 56 are spaced on opposite sides of and are parallel with the primary axle 30 and join together the medial portions of upper side frame member 52 and the medial upper frame member 54. Auxiliary supports 57 and 58 extend between the medial portions of respective reinforcing plates 55 and 56 and end pieces 51 and 50.

The thus reinforced portion of the upper frame B supports a loading fork broadly indicated at F in FIG. 2 and comprising fork arms 60 and 61 arranged forwardly and rearwardly of wheel 31. The fork arms 60 and 61 are supported by side frame member 52 and by auxiliary supports 57 and 58.

Each of the fork arms 60 and 61 includes a load supporting surface 62 and an angled base 63. Each base 63 includes an inner portion 64 extending outwardly from the upper side frame member 52 in parallel relation to the support surface 62 to a point 65, from where an outer portion 66 extends upwardly at an angle to the free end of the fork arm.

The tubular end pieces 50 and 51 function as sockets for a telescopic handle broadly indicated at H and including a cross bar 70 extending perpendicularly to the primary axle 30 between telescopic support arms 71 and 72.

Figure 5:
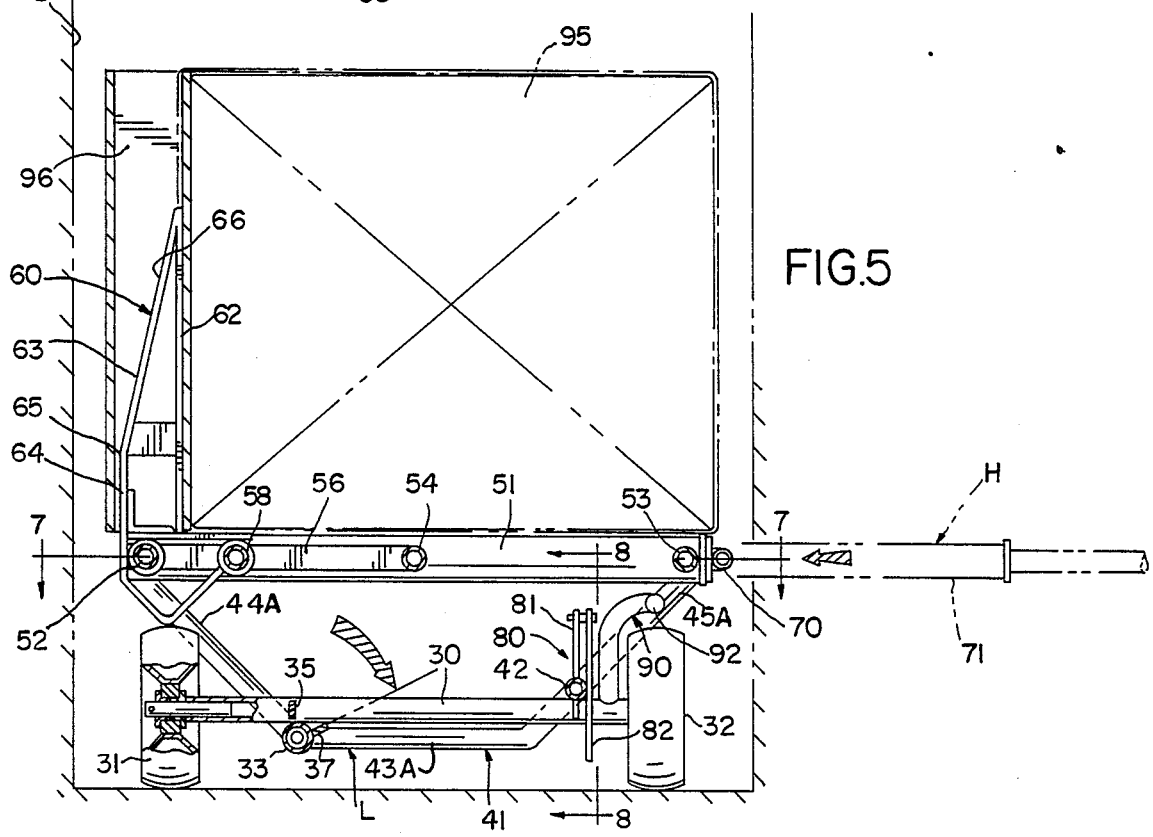

In use, the upper frame B moves relative to the lower frame L in the loading of cargo (FIGS. 3, 4 and 5), and the upper frame B is releasably attached to the lower frame L by a latch assembly 80 in the loaded or traveling position of FIG. 5.

The latch assembly 80 includes an upstanding plate 81 fixed to and extending upwardly from the lower side frame member 42 near the wheel 32. A pivotal latch 82 having a notch 83 (FIG. 8) is pivotally connected to and hangs loosely from the upstanding plate 81 above the primary axle 30. The lower free end 84 of the latch 82 is tapered to define a cam surface which engages and rides over the primary axle 30 as the upper frame B is moved downwardly to the loaded or traveling position of FIG. 5 (see also the sequential views of FIGS. 8 and 9).

A footstep 90 overlies the wheel 32 and comprises a support bar extending upwardly from the primary axle 30 and a cross bar 92 extending transversely to the axle 30 above the wheel 32.

OPERATION

It is intended that the side loading hand truck of the first described embodiment be used by a single operator to lift and load in a single operation cargo weighing as much as one thousand (1,000) pounds.

The hand truck is loaded by positioning the truck with the fork arms 60 and 61 in the elevated or traveling position of FIG. 1 beside an elongated cargo 95 strapped to a pallet 96 to be loaded. The axle latch 82 is then disconnected from the primary axle 30 to permit the upper support frame B to be lifted and rotated to the left in FIG. 3 relative to the lower frame L until the flanges 37 on the auxiliary axle 36 engage the abutment 35 on the primary axle 30 to prevent further relative movement between the upper frame B and the lower frame L.

The truck is completely turned to rest on its forks 60 and 61 and the truck is then maneuvered on its forks to locate the forks in position to be inserted in the pallet as shown in FIG. 2. A plurality of articles 95 are shown strapped to the pallet 96, but there may be one or more articles to be loaded, as desired.

The hand truck is pushed on the lift forks 60 and 61 to position the forks beneath the cargo to be loaded, as within the pallet 96 (FIGS. 2 and 3). As indicated by the solid line position of the hand truck in FIG. 3, the hand truck is initially pushed forward past the vertical about the angle formed by the creases 65 in the bases 63 of fork arms 60 and 61 to place the free ends of the fork arms beneath the cargo 95. When the fork arms 60 and 61 are fully seated beneath the cargo, the handle H is extended and the hand truck is pivoted backwardly through its dotted line vertical position in FIG. 3 to the transitory loading position of FIG. 4.

The wheels are returned to the floor with the cargo on the truck by the operator grasping the extended handle 70 while stepping on the footstep 90 with the truck in about the dotted line position of FIG. 3. Continued downward pressure on the footstep 90 and handle 70 returns the upper frame B to the lower frame L with the cargo 95 in the traveling position of FIG. 5. The cammed latch 82 automatically rides over the primary axle 30 until the notch 83 fits around the axle to lock the upper frame B and the lower frame L together.

The handle H is then pushed inwardly from its extended dotted line position to the closed solid line position of FIG. 5 and the operator goes to one end of the articles being carried and pushes against them to move the loaded hand truck to its destination.

FIG. 5 shows the capability of the loaded hand truck passing through a 36 inch wide doorway D.

MODIFIED FORM

The modified form illustrated in FIGS. 14 through 23 is particularly adapted to carry large cylindrical cargo such as a heavy roll of carpet weighing as much as fifteen hundred (1,500) pounds.

The embodiment of FIGS. 14 through 23 includes a lower support frame broadly indicated at R and an upper frame assembly A. The lower support frame R comprises a rectangular frame 100 including lower side frame members 101 and 102 and end pieces 103 and 104 joined together at their proximal ends. The rectangular frame 100 is supported by an axle 105 on which wheels 106 and 107 are suitably journaled for rotation.

Stabilizing straps 110, 111, 112, and 113 extend downwardly from the inner surfaces of lower side frame members 101 and 102 at their junctures with end pieces 103 and 104. Corner posts, 114, 115, 116, and 117 are fixed to the outer surfaces of the lower side frame members 101 and 102 in opposition to the said stabilizer straps and the corner posts extend upwardly and downwardly from their respective side frame members 101 and 102 and terminate at their lower ends in the same plane as the lower ends of the stabilizer straps. Caster wheels 118 are journaled in the lower end portions of corresponding stabilizer straps and corner posts.

The upper ends of the corner posts 114, 115, 116, and 117 support upper side frame members 120 and 121 of the upper frame assembly A. An arcuately shaped support grid 122 extends between the upper side frame members 120 and 121 in overlying relation to the axle 105 and wheels 106 and 107.

An arcuate end piece 123 extends between the corner posts 114, 115 and a corresponding arcuate end piece 124 extends between the corner posts 116 and 117. Extensions 123A and 124A of the arcuate end pieces 123 and 124 curve upwardly and inwardly above the truck, terminating in substantially the vertical plane of the corner posts 114 and 117 as seen in FIG. 18.

A loading fork is defined by fork arms 125 and 126 which curve upwardly and outwardly from adjacent the lower ends of corner posts 114 and 117. The fork arms 125 and 126 lie in the same vertical planes as respective curved end pieces 123 and 124, and the upper ends of the curved fork arms 125 and 126 merge with the upper ends of the extensions 123A and 124A, respectively.

A lifting plate 130 is fastened to the ends of the curved fork arms 125 and 126, and comprises a rectangular sheet of steel divided into a toe portion 131 and a heel portion 132 by a longitudinally extending crease 133 at about its mid portion.

The fork arms 125 and 126 are reinforced by support bars 140 and 141 extending outwardly from the upper ends of the corner posts 114 and 117, respectively. Another support bar 142 extends between the curved fork arms 125 and 126 and is joined thereto at about the junctures of the support bars 140 and 141 with the curved forks 125 and 126.

Foldable handles 150 and 151 are pivotally connected to brackets 152 and 153 extending outwardly from corner posts 115 and 116, respectively. Each of the handles 150 and 151 corresponds in length to the length of the hand truck which, in the illustrated embodiments, is about four (4) feet long. FIG. 22 shows the handles 150 and 151 folded inwardly against a loaded hand truck and it will be noted that each of the handles is about the same length as the hand truck.

It has been found that long handles are desirable when loading heavy rolls of carpet (or other heavy cylinders) so that advantage can be taken of the mechanical leverage provided by using the long handles. The handles 150 and 151 are constructed alike so that a description of the handle 151 will suffice for an understanding of the construction of both handles. Handle 151 comprises two bars 154 and 155 joined together by a small plate 156 at their outer ends. The inner ends of the arms 154, 155 are pivotally connected by bolts 157 to the brackets 153 (FIG. 20).

A finger 160 extends outwardly from the bracket 153 in a direction parallel with the axis of the axle 105. A tubular keeper 161 is loosely mounted for sliding movement along the handle portion 154. The keeper 161 is registrable with the finger 160 when the handle 151 is extended to the loading position of FIGS. 14, 15, 16, 17, and in the dotted line position of FIG. 18. FIGS. 19, 20, and 21 show the keeper 161 engaged with the locking finger 160 to hold the handle 151 in extended position during loading.

The keeper 161 has a finger 162 projecting away from the finger 160 on the bracket 153 and receivable within a second keeper 163 on the arm 154A of the other handle 150 (FIG. 23) to lock the handles in closed position during travel.

OPERATION

Figure 14:
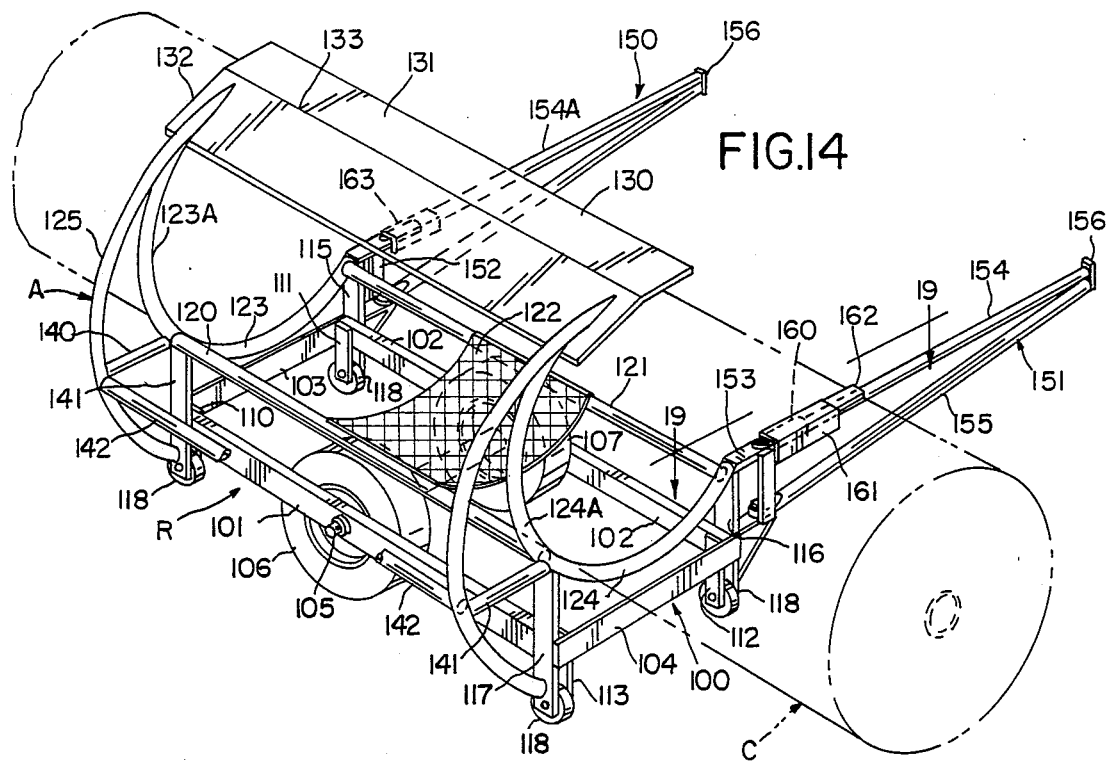
FIG. 14 is a perspective view of another embodiment of the side loading hand truck, with parts broken away, and showing the wheels in the traveling position and the handles extended preparatory to turning the truck on its side to the loading position of FIG. 15, and showing a cylindrical cargo in phantom lines.
Figure 15:
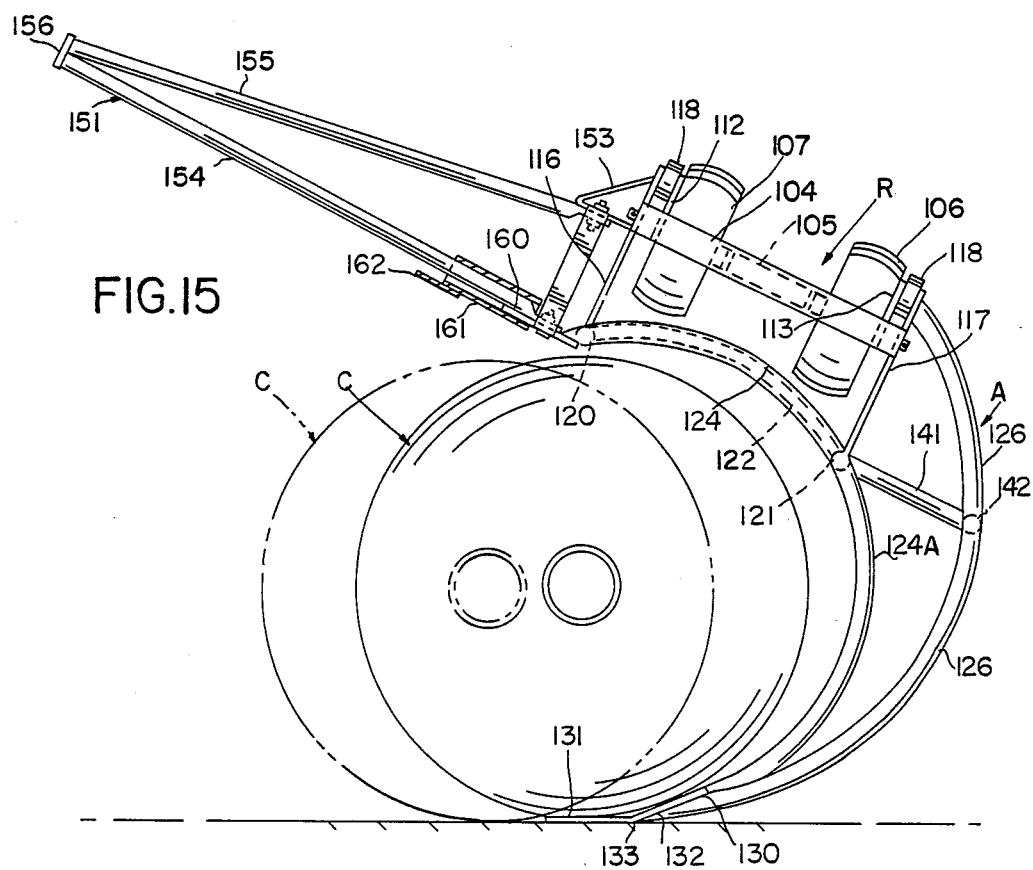
FIG. 15 is an end view showing the hand truck of FIG. 14 after having been turned on its fork side for loading with the loading fork positioned initially beneath cylindrical cargo shown in phantom lines, and showing the cargo in solid lines after it has been rolled onto the lifting fork.

As in the first described embodiment, the hand truck of FIG. 14 is loaded by positioning the hand truck beside a roll of carpet or other cylindrical article C to be loaded with the axis of the article C extending transversely to the axle 105 and parallel to the direction of travel. The handles 150 and 151 are extended to the loading position of FIGS. 14 through 17 and the dotted line position of FIG. 18. The hand truck is then turned on its rounded fork side and supported by the fork arms 125 and 126 while positioning the toe 131 of lift plate 130 beneath the cylindrical article C, as shown in the dotted line position of FIG. 15. The cylindrical article C is then rolled on the plate 130 to the solid line positon of article C in FIG. 15.

Because of the size and weight of carpet rolls and other cylindrical articles which the hand truck of FIG. 14 is capable of moving, it is intended but not required, that two persons cooperate in loading the truck of FIG. 14. The truck of FIG. 14 is preferably structured to balance itself in the loading position of FIG. 15 while at least one person rolls the article C from its dotted line position to its solid line position on the plate 130.

Each person may then grasp one of the handles and pull up on it while standing on the support bar 142 (FIG. 16). Standing on the support bar 142 and pulling up on the handles 150 and 151 rotates the hand truck to the right in FIGS. 16 and 17 while simultaneously loading the cylindrical article C onto the upper frame assembly A of the hand truck. The operators return the wheels 106 and 107 to the floor with continued pressure on the handles while stepping successively from the support bar 142 (FIG. 16) to the lower side frame member 101 (FIG. 17), and to the floor when the handles 150 and 151 approach the dotted line position of handle 151 in FIG. 17. Continued downward pressure on the handles 150 and 151 completes the loading of the article C by returning the wheels to the floor as shown in FIG. 18. The handles are then moved from the extended dotted line position to the folded solid line position of handle 151 in FIG. 18.

With the handles folded inwardly to the solid line position of FIG. 18, the hand truck can be moved to its destination by pushing against one end of the cylindrical article C and can be conveniently moved through an ordinary doorway, such as indicated at D in FIG. 18, without adjustment of any kind.

There is thus provided a sideloading hand truck capable of picking up and moving heavy and elongated loads through ordinary doorways without any reorientation of the truck or its load at any time.

The words "transversely" and "transverse" are used throughout the specification and claims interchangeably with the words "perpendicularly" and "perpendicular" to mean the same thing.

The words "hand truck" and "truck" are used throughout the specification and claims to mean the same thing and refer to any manually operable wheeled vehicle for conveying cargo.

Although specific terms have been used in describing the invention, they have been used in a generic sense only and not for the purpose of limitation. It is recognized that the illustrated embodiments are not the only way of making or using the invention, and it is intended to obtain patent protection on the invention as defined in the following claims, considered in light of the specification and drawings, and in light of the prior art.

I claim:

1. In a handtruck having two sides parallel to the direction of travel and a wheeled axle extending between the two sides, the improvement which comprises a loading fork extending in perpendicular relation to said sides from one of the two sides of the handtruck, a handle extending in perpendicular relation to said sides from the other side of the handtruck, and said handle being extensible for loading and retractable for travelling.

2. In a hand truck having a wheeled axle extending between two sides of the truck which are parallel to the direction of travel, the truck including a loading fork extending perpendicularly from one of said sides of the truck which is parallel with the direction of travel, means for turning the truck from an original position on its wheels to a second position with the loading fork on a supporting surface and with the wheels off of the supporting surface, means for loading an article on the truck including an auxiliary axle journaled on a lower support frame attached to said parallel side frames in a transverse direction to said wheeled axle.

3. In a hand truck having an axle extending between opposed sides of the truck which are parallel to the direction of travel and having wheels journaled on the axle, the truck including a loading fork extending from one of said sides of the truck which is parallel to the direction of travel, means for rotating the truck between a first position with the wheels on a supporting surface and the fork above the supporting surface and a second position with the wheels above the supporting surface and the fork on the supporting surface, said means including an auxiliary axle journaled in a direction transverse to the axle, a support frame fixed to the auxiliary axle and movable therewith relative to the axle and wheels, and said loading fork extending from the support frame.

4. A hand truck having frame members on opposed sides of the truck extending parallel with each other and parallel with the direction of travel, an axle extending between said frame members in a direction transverse to said frame members and transverse to the direction of travel and a pair of wheels journaled on the axle, the improvement which comprises a loading fork extending from only one of said frame members in a first plane transverse to said frame members and to the direction of travel, and a handle extending from only the frame member opposed to said one frame member in the same plane that said frame members are in.

5. A hand truck having a wheeled axle extending between two sides of the truck which are parallel to the direction of travel, the improvement comprising a loading fork extending outwardly from one of said sides of the truck, said loading fork extending transversely to the plane defined by said sides, and means for rotating the sides of the truck about an axis which is transverse to the wheeled axle in order to effect loading of the truck.

6. A hand truck according to claim 1 wherein the width of the hand truck with the handle retracted is less than the width of a three foot doorway.

7. A hand truck according to claim 4 including a lower support frame and an upper frame, means interconnecting the lower support frame and the upper support frame, means connecting the fork to the upper frame, means connecting the handle to the upper frame, and means supporting the lower frame for movement in a direction parallel to the longitudinal axes of the loaded articles.

8. A hand truck according to claim 7 including means connecting the upper frame to the lower frame for relative movement of the upper and lower frames during loading of the hand truck.

9. A hand truck according to claim 2 wherein the fork is curved.

10. A hand truck according to claim 2 wherein the fork is straight.

11. A hand truck according to claim 2 wherein said means for turning the truck on one side includes a handle on the opposite side of the truck.

12. A hand truck according to claim 11 which includes means for locking the handle in extended position during loading of the truck.

13. A hand truck according to claim 2 including means for limiting relative movement between the wheeled axle and the auxiliary axle.

14. A hand truck according to claim 2 wherein said means for loading an article on the truck while returning the truck to its original position includes means for positioning the fork under an article to be loaded, a handle on the opposite side of the truck, means for extending the handle for mechanical advantage during loading of an article, and means for supporting an operator on said opposite side of the truck.

* * * * *